United States Patent [19]

Nakashima et al.

[11] Patent Number: 5,326,646
[45] Date of Patent: Jul. 5, 1994

[54] SYNCRONIZER RING HAVING A SPRAY-COATED FILM OF A WEAR-RESISTANT BRASS MATERIAL

[75] Inventors: Kunio Nakashima; Masao Hosoda; Wataru Yago; Kazuyuki Inagaki, all of Toyama, Japan

[73] Assignee: Chuetsu Metal Works Co., Ltd., Toyama, Japan

[21] Appl. No.: 984,940

[22] Filed: Dec. 4, 1992

[51] Int. Cl.$^5$ .................................. B22F 5/08
[52] U.S. Cl. ..................... 428/561; 428/546; 428/547; 428/551; 428/552; 428/553
[58] Field of Search ........... 75/157.5; 148/433; 192/70.15, 53 F; 428/552, 561, 562, 563

[56] References Cited

U.S. PATENT DOCUMENTS 4,191,564  3/1980  Hirao et al. ................... 75/157.5
4,597,484  7/1986  Takiguchi et al. ........... 192/70.15

FOREIGN PATENT DOCUMENTS 56133433  3/1980  Japan .
 6134154  7/1984  Japan .
 6280243  10/1985  Japan .
 6280244  10/1985  Japan .
63157825  9/1986  Japan .

Primary Examiner—Donald P. Walsh
Assistant Examiner—John N. Greaves
Attorney, Agent, or Firm—Flynn, Thiel, Boutell & Tanis

[57] ABSTRACT

A synchronizer ring comprises a ring body having a sliding portion, and a directly spray-coated wear-resistant film formed on a surface of the sliding portion. The film is made of a wear-resistant brass alloy which comprises Cu, Zn and at least one element selected from the group consisting of Al, Mn, Fe, Ni, Si, Co, Cr, Ti, Nb, V, Zr and Mo. The spray-coated film exhibits good wear resistance and good bonding strength.

4 Claims, 1 Drawing Sheet

SYNCRONIZER RING HAVING A SPRAY-COATED FILM OF A WEAR-RESISTANT BRASS MATERIAL

BACKGROUND OF THE INVENTION

1. Field of the Invention

This invention relates to a synchronizer ring which is adapted for use in transmissions of vehicles which require high torques.

2. Description of the Prior Art

As is known in the art, synchronizer rings have been usually fabricated using only a wear-resistant copper alloy. With the transmissions of vehicles, such as large-sized vehicles or sport cars, which need high power and high torque, the synchronizer ring has been fabricated wherein a synchronizer ring body is made of an iron material and a wear-resistant film or layer is formed on the surface of a sliding portion of the ring body. By this, a high wear resistance is imparted to the sliding portion of the synchronizer ring. This has been realized in the following manner.

1. Mo which is known to have a high wear resistance is spray-coated at a sliding portion.
2. A mixture of a wear-resistant aluminum alloy and Mo is spray-coated at a sliding portion.
3. A wear-resistant part is bonded to a sliding portion mechanically or by welding.

The Mo spray-coating procedure has been widely performed at present for application to large-sized vehicles. However, Mo is very expensive, resulting in the high production costs of the ring article.

The spray-coating of a mixture of a wear-resistant aluminum alloy and Mo has now been used in some synchronizer rings. This is because Si contained in the wear-resistant aluminum alloy is liable to impede wettability with a matrix body on spray-coating, thereby lowering the bonding strength of the coated film. In fact, limitation is placed on the applications except for large-sized vehicles.

With wear-resistant parts being bonded mechanically or by welding, a wear-resistant part has a sliding surface shaped in the form of a ring and inserted into a synchronizer ring body. Thereafter, the part may be fixed with a pin. Alternatively, the part may be subjected to a complicated procedure of the combination of shrink fitting, cold fitting and electron beam welding. Thus, the fabrication becomes very complicated. In addition, an increasing number of parts are essential with an additional number of assembling steps, thus leading to an inconvenience from the standpoint of production costs.

SUMMARY OF THE INVENTION

It is accordingly an object of the invention to provide a synchronizer ring making use of an inexpensive wear-resistant material which ensures a high wear resistance and a stable bonding strength when spray-coated as a film on the sliding surface of a ring body.

It is another object of the invention to provide a synchronizer ring which has a metallized wear-resistant film formed at a sliding portion by a simple spray-coating procedure whereby the ring can stand high load when used in transmissions of vehicles requiring high power and high torque.

The above objects can be achieved, according to the invention, by a synchronizer ring which comprises a ring body having a sliding portion, and a directly spray-coated wear-resistant film formed on a surface of the sliding portion, the film being made of a wear-resistant brass alloy which comprises Cu, Zn and at least one element selected from the group consisting of Al, Mn, Fe, Ni, Si, Co, Cr, Ti, Nb, V, Zr and Mo.

Preferably, Mo is added to the wear-resistant alloy in an amount of from 1 to 50 wt. % based on the alloy.

PREFERRED EMBODIMENT OF THE INVENTION

Figure 1:
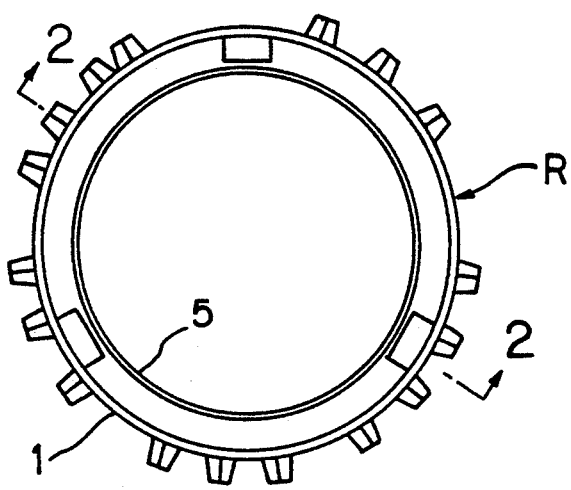
FIG. 1 is a schematic plan view of a synchronizer ring according to one embodiment of the invention.
Figure 2:
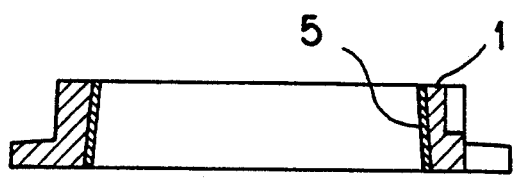
FIG. 2 is a sectional view taken along the line A—A of FIG. 1.

Reference is now made to the accompanying drawings and particularly, to FIGS. 1 and 2. In these figures, there is shown a synchronizer ring R according to one embodiment of the invention. The ring R is of the inside sliding type wherein the ring is slided with a gear cone along the inner periphery thereof. The ring R has a synchronizer ring body 1 and a wear-resistant film 5 on the inner peripheral surface serving as a sliding portion. The synchronizer ring body 1 is made, for example, of an iron material such as JIS G4052 SCM435H, a copper material such as JIS H3250 C6783, an aluminum material such as JIS H4040 6063, or the like. The ring body 1 is fabricated by hot forging the material at a forging temperature of 1000° C., thermal treatments (carburization and quenching) and machine works (lathing, machining and polishing). The wear-resistant film 5 is formed by direct spraying of a wear-resistant brass material.

The wear-resistant brass alloy used in the invention comprises Cu, Zn and at least one element selected from the group consisting of Al, Mn, Fe, Ni, Si, Co, Cr, Ti, Nb, V, Zr and Mo. Preferably, the brass alloy comprises 50 to 80 wt. % of Cu, 20 to 45 wt. % of Zn and 0.1 to 10 wt. % of Al, Mn, Fe, Ni, Si, Cu, Cr, Ti, Nb, V and Zr. More preferably, the at least one element is Al, Mo, or Fe. When present, Mo content is from 1 to 50 wt. % of the alloy.

The brass alloy has a structure which consists of a matrix and an intermetallic compound which is harder than the matrix. The matrix structure consists of an $\alpha + \beta$ phase, a $\beta$ phase or a $\beta + \gamma$ phase. The intermetallic compound has a micro Vickers hardness no lower than 300. When the brass alloy is directly spray-coated on a sliding portion of the ring, the resultant film becomes very hard and resistant to wear. The direct spray coating used herein means an ordinary spray-coating procedure such as a high velocity oxygen-fuel gas system, an ultrasonic spray coating using an oxygen gas-mixed fuel gas, a metallizing procedure or a plasma spray coating.

The spray coating brass alloy does not always contain Si. If present, the content of Si is very small. Accordingly, the wettability with the ring body is not impeded and stable bonding strength of the wear-resistant film is attained.

Mo is preferably added to the brass alloy in an amount of from 1 to 50 wt. % based on the brass alloy. If Mo is added to the alloy composition, the wear resistance and the bonding strength are further improved. However, if the content is less than 1 wt. %, the improving effect is not expected. On the contrary, when the content exceeds 50 wt. %, any further improvement is not expected. This is the reason why the content of Mo ranges preferably 1 to 50 wt. %.

Figure 3:
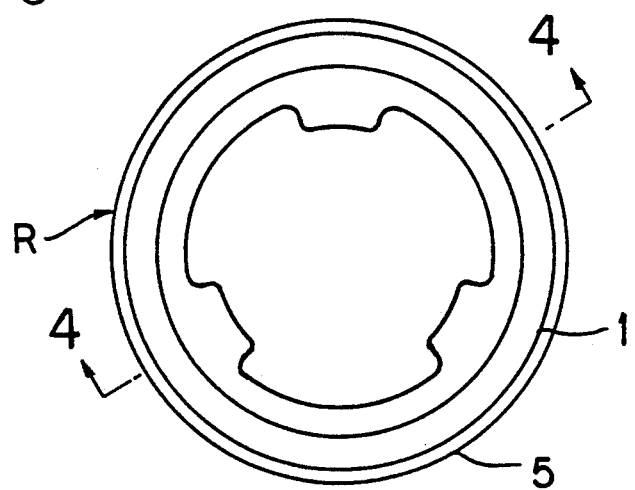
FIG. 3 is a schematic plan view of a synchronizer ring according to another embodiment of the invention.
Figure 4:
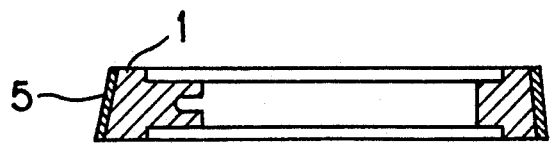
FIG. 4 is a sectional view taken along the line B—B of FIG. 3.

FIGS. 3 and 4 show another embodiment of the invention. The synchronizer ring R of this embodiment is of the outside sliding type wherein the ring is slidedly contacted with a cone sleeve at the outer peripheral surface thereof. Accordingly, the synchronizer ring body 1 has the wear-resistant film 5 formed along the outer periphery of the body 1 as shown in FIGS. 3 and 4.

The invention is more particularly described by way of examples.

EXAMPLES

Wear-resistant brass alloys having compositions indicated in Table 1 were prepared. Actually, alloy Nos. 1, 3, 5, 6 and 7 were used and alloy Nos. 2 and 4 are shown in Table 1 only for illustration.

The brass alloy Nos. 1, 3, 5, 6 and 7 were fundamentally used, with or without addition of Mo, for spray coating the respective alloys by a high velocity oxygen-fuel system to form a wear resistant film on the inner peripheral surface of each ring, thereby obtaining synchronizer rings of the invention and for comparison. The respective rings were subjected to wear resistant and bonding strength tests. The test conditions for the wear resistance are shown in Table 2 below wherein the wear-resistant film was formed in a thickness of 100 μm.

TABLE 2
WEAR-RESISTANT TEST CONDITIONS

| | |
|---|---|
| Number of Revolution | 1800 r.p.m. |
| Applied Load | 70 Kgf |
| Number of Load Application | 2,000 cycles |
| Application Time | 0.3 seconds under load |
| | 1.5 seconds under loan-free conditions |
| Lubricant | ATF Dexron |
| Manner of Lubrication | dipped to a level corresponding to ½ of the ring diameter |
| Temperature of Lubricant | 70° C. ± 5° C. |
| Opposing Member | SCM-22H |

TABLE 1

| No. | Cu | Zn | Al | Si | Fe | Ni | Ti | Mn | Zr | Mo | Nb | Cr | Co |
|---|---|---|---|---|---|---|---|---|---|---|---|---|---|
| 1 | Bal* | 28 | 4 | 0.6 | 0.7 | — | — | — | 1 | — | — | — | — |
| 2 | " | 26 | 5 | — | 1 | — | — | 2.5 | — | 0.2 | — | — | — |
| 3 | " | 30 | 4 | — | — | 1 | 1 | — | — | — | 0.5 | — | — |
| 4 | " | 25 | 6 | — | 1.5 | — | — | 2.5 | — | — | — | 0.3 | — |
| 5 | " | 30 | 4 | 1 | 1 | 3 | — | — | — | — | — | — | 1.5 |
| 6 | " | 38 | 1.5 | 1 | — | — | — | 2.5 | — | — | — | — | — |
| 7 | " | 31 | 3 | 1 | — | — | — | 3 | — | 0.2 | — | — | — |

*100 wt. % in total.

Synchronizer ring bodies as shown in FIGS. 1 and 2 were fabricated using JIS G4052 SCM435H material to have an inner diameter of 66 mm by subjecting the material to hot forging at a temperature of 1000° C., carburization and quenching, and lathing, machining and polishing.

The bonding strength was determined by a tensile test of the bonded portion according to the procedure of ASTMC633.

The results of both tests are shown in Tables 3 and 4.

TABLE 3
Results of the Wear-Resistance Test

| | Material of Ring Body | Spray-coated Film on Sliding Portion | Wear Depth (μm) |
|---|---|---|---|
| Inventive Synchronizer Ring No. | | | |
| 1 | SCM 435 | brass alloy No. 1 of Table 1 | 80 |
| 2 | " | brass alloy No. 3 of Table 1 | 70 |
| 3 | " | brass alloy No. 6 of Table 1 | 210 |
| 4 | " | brass alloy No. 7 of Table 1 | 180 |
| 5 | " | brass alloy No. 6 + 1 wt. % Mo | 152 |
| 6 | " | brass alloy No. 6 + 10 wt. % Mo | 143 |
| 7 | " | brass alloy No. 6 + 30 wt. % Mo | 131 |
| 8 | " | brass alloy No. 6 + 50 wt. % Mo | 124 |
| Comparative Synchronizer Ring No. | | | |
| 9 | " | brass alloy No. 6 + 60 wt. % Mo | 125 |
| 10 | " | brass alloy No. 6 + 70 wt. % Mo | 124 |
| 11 | " | 100 wt. % Mo | 150 |
| 12 | " | (15 wt. % Si—Al alloy) + 50 wt. % Mo | 250 |
| 13 | ring formed solely of alloy No. 1 of Table 1 | | 160 |
| 14 | ring formed solely of alloy No. 7 of Table 1 | | 310 |

TABLE 4
Results of the Bonding Strength Test

| | Material of Ring Body | Spray-coated Film at Sliding Portion | Bonding Strength (Kgf/cm²) |
|---|---|---|---|
| Inventive Synchronizer Ring No. | | | |
| 1a | SCM 435 | brass alloy No. 1 of Table 1 | 560 |

TABLE 4-continued

| | Material of Ring Body | Results of the Bonding Strength Test Spray-coated Film at Sliding Portion | Bonding Strength (Kgf/cm$^2$) |
|---|---|---|---|
| 2a | " | brass alloy No. 1 of Table 1 + 1 wt. % Mo | 580 |
| 3a | " | brass alloy No. 1 + 10 wt. % Mo | 583 |
| 4a | " | brass alloy No. 1 + 30 wt. % Mo | 588 |
| 5a | " | brass alloy No. 1 + 50 wt. % Mo | 590 |
| 6a | " | brass alloy No. 5 of Table 1 | 565 |
| 7a | " | brass alloy No. 5 + 1 wt. % Mo | 583 |
| 8a | " | brass alloy No. 5 + 10 wt. % Mo | 585 |
| 9a | " | brass alloy No. 5 + 30 wt. % Mo | 588 |
| 10a | " | brass alloy No. 5 + 50 wt. % Mo | 592 |
| Comparative Synchronizer Ring No. | | | |
| 11a | " | brass alloy No. 1 + 70 wt. % Mo | 588 |
| 12a | " | brass alloy No. 5 + 70 wt. % Mo | 590 |
| 13a | " | 100 wt. % Mo | 525 |
| 14a | " | (15 wt. % Si—Al alloy) + 50 wt. % Mo | 350 |

1) On comparison between Ring Nos. 1 and 13 and also between Nos. 4 and 14 of Table 3, it will be seen that the spray-coated film of an alloy is better in the wear resistance than the ring made solely of the alloy.

2) On comparison with the prior art spray coatings of Mo (Alloy No. 11 of Table 3 and Alloy No. 13a of Table 4) and the prior art spray coatings of 15 wt. % Si/Al alloy and 50 wt. % Mo (Alloy No. 12 of Table 3 and No. 14a of Table 4, better results are obtained in the present invention with respect to the bonding strength and the wear resistance.

3) When Mo is added in an amount of from 1 to 50 wt. %, both wear resistance and bonding strength are significantly improved. However, if the content exceeds 50 wt. %, a further improvement is not expected.

4) The wear resistance of spray-coated synchronizer rings depends greatly on the type of spray-coating alloy.

5) When Mo is added to spray-coating alloys such as, for example, Alloy No. 6 of Table 1, which are not so good with respect to the wear resistance, the wear resistance can be improved.

As will be apparent from the foregoing, the synchronizer ring of the invention having a wear-resistant film formed at a sliding portion has not only a good wear resistance, but also a good bonding strength. The wear-resistant film can be formed by a simple spray-coating method and an inexpensive synchronizer ring can be obtained.

The embodiments of the invention in which an exclusive property or privilege is claimed are defined as follows:

1. A synchronizer ring which comprises a ring body having a sliding portion, and a directly spray-coated wear-resistant film formed on a surface of the sliding portion, said film being made of a wear-resistant brass alloy which comprises Cu, Zn and at least one element selected from the group consisting of Al, Mn, Fe, Ni, Si, Co, Cr, Ti, Nb, V, Zr, and Mo.

2. The synchronizer ring according to claim 1, wherein said alloy comprising 50 to 80 wt. % of Cu, 20 to 45 wt. % of Zn and 0.1 to 10 wt. % of said at least one element other than Mo which, if present, is from 1 to 50 wt. % of the alloy.

3. The synchronizer ring according to claim 1, wherein said wear-resistant film is formed on an inner peripheral surface of said ring.

4. The synchronizer ring according to claim 1, wherein said wear-resistant film is formed on an outer peripheral surface of said ring.

* * * * *

UNITED STATES PATENT AND TRADEMARK OFFICE
CERTIFICATE OF CORRECTION

PATENT NO. : 5 326 646
DATED : July 5, 1994
INVENTOR(S) : Kunio NAKASHIMA, et al It is certified that error appears in the above-indentified patent and that said Letters Patent is hereby corrected as shown below:

On the title page, item [54], line 1;
    change "SYNCRONIZER" to ---SYNCHRONIZER---.

Signed and Sealed this

First Day of November, 1994

Attest:

BRUCE LEHMAN

*Attesting Officer*    *Commissioner of Patents and Trademarks*